United States Patent
Oishi et al.

(10) Patent No.: US 6,921,567 B2
(45) Date of Patent: Jul. 26, 2005

(54) DISK RECORDING MEDIUM (75) Inventors: Kengo Oishi, Kanagawa (JP); Shinichi Kato, Kanagawa (JP); Yasushi Endo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/166,746

(22) Filed: Jun. 12, 2002

(65) Prior Publication Data

US 2002/0192425 A1 Dec. 19, 2002

(30) Foreign Application Priority Data

| Jun. 13, 2001 | (JP) | ..................................... P.2001-178727 |
| Jul. 6, 2001 | (JP) | ..................................... P.2001-206762 |
| Jul. 30, 2001 | (JP) | ..................................... P.2001-229765 |

(51) Int. Cl.[7] ............................................... B32B 3/02
(52) U.S. Cl. .................. 428/64.1; 428/64.4; 430/270.11
(58) Field of Search ............................. 428/64.1, 64.4, 428/913; 430/270.11, 495.1, 945; 369/283, 275.5

(56) References Cited

U.S. PATENT DOCUMENTS

| 4,100,046 A | | 7/1978 | Hodakowski et al. |
| 4,672,395 A | * | 6/1987 | Arai et al. ................ 346/135.1 |
| 6,447,868 B1 | * | 9/2002 | Sekiguchi ................. 428/64.1 |
| 6,468,620 B2 | * | 10/2002 | Waki ........................ 428/64.1 |

FOREIGN PATENT DOCUMENTS

EP 0 847 050 A2 6/1998

OTHER PUBLICATIONS

Database WPI, Section Ch, Week 198813, Derwent Publications Ltd., London, GB; Class A89, AN 1988–088051, XP–0022255876 and JP 63 039159 A.

* cited by examiner

*Primary Examiner*—Elizabeth Mulvaney
(74) *Attorney, Agent, or Firm*—Sughrue Mion, PLLC (57) ABSTRACT

A disk recording medium of the present invention comprises an antimicrobial agent and an antifungal agent.

4 Claims, 5 Drawing Sheets

DISK RECORDING MEDIUM

BACKGROUND OF THE INVENTION

1. Field of the Invention

The present invention relates to a disk recording medium such as optical disk and photomagnetic disk.

2. Description of the Related Art

As a disk recording medium which is used left unreceived in a cartridge, i.e., in a so-called single form there is known one comprising a printing surface provided on one side thereof and a recording surface provided on the other. A printing layer is formed by a printing ink on the printing surface. The printing surface displays the contents of data recorded in the disk recording medium. As such a disk recording medium there is known an optical disk such as musical CD and CD-R.

Such a disk recording medium is often received and stored in a plastic case when not in use. The plastic case also receives an index card (title card) indicating the contents of data recorded in the disk recording medium.

For example, when a disk recording medium is stored in a plastic case at a proper temperature and humidity for a long period of time, fungi can grow on the index card or disk recording medium (particularly on the printing surface) because the paper fiber constituting the index card or the printing layer in the disk recording medium contains nutrient. Further, when the user handles the index card, the disk recording medium and the plastic case, they are stained with dirt or oil of the user's hand that causes the proliferation of fungi.

In particular, since the paper fiber constituting the index card exerts a great moisture-retaining effect, fungi which has grown on the index card can easily move to the surroundings. When fungi which has grown on the index card moves to the plastic case or disk recording medium, fungi can acceleratedly grow on the plastic case or the printing surface of the disk recording medium.

The printing surface of the disk recording medium stained with fungi apparently has an outstanding dirt that lowers the credit thereof with the user and hence the commercial value. Further, when the recording surface of the disk recording medium is stained with fungi which has moved from the printing surface or the like, normal reading and writing of recorded data cannot be performed.

The recent high capacity optical disk (e.g., DVD) is required to use a recording light beam having a very small spot diameter in order to accomplish high density recording. To this end, a laser source having a short wavelength is used. Alternatively, the aperture of lens is raised. Such an optical disk tends to have a very small distance between the recording surface and the condenser. When the recording surface of the optical disk has fungi, the fungi can move to laser pick up lens or the interior of drive, making it unlikely that normal reading and writing of recorded data can he performed.

SUMMARY OF THE INVENTION

The invention has been worked out under these circumstances. An object of the invention is to provide a disk recording medium which can be remarkably prevented from proliferation or attachment of fungi.

The object of the invention is accomplished with a disk recording medium as mentioned below.

(1) A disk recording medium comprising at least one of an antimicrobial agent and an antifungal agent.

(2) The disk recording medium according to the item (1), which comprises on the recording surface thereof a layer containing at least one of the antimicrobial agent and the antifungal agent.

(3) The disk recording medium according to the items (1) or (2), which comprises a printing layer provided on one side thereof, wherein the printing layer contains at least one of the antimicrobial agent and the antifungal agent.

(4) The disk recording medium according to any one of the items (1) to (3), which comprises:
a printing layer provided on one side thereof; and
a layer containing at least one of the antimicrobial agent and the antifungal agent, in which the layer is provided on the printing layer.

(5) The disk recording medium according to the item (3), wherein the printing layer is formed by a printing ink containing at least one of the antimicrobial agent and the antifungal agent.

(6) The disk recording medium according to the item (5), wherein the printing ink contains an ultraviolet-curing resin.

(7) The disk recording medium according to the item (6), wherein the printing ink is subject to an ultraviolet-curing treatment after coating.

(8) The disk recording medium according to any one of the items (2) to (4), wherein the layer containing at least one of the antimicrobial agent and the antifungal agent is provided on at least one of an outer periphery and inner periphery of the disk recording medium.

DESCRIPTION OF THE REFERENCE NUMERALS AND SIGNS

10, 20, 30, 40, 50, 100, 110 Disk recording medium
11, 21, 31, 41, 51 Substrate
12, 42, 52 Antimicrobial/antifungal layer
22a, 32a Antimicrobial/antifungal layer on the outer periphery
22b, 32b Antimicrobial/antifungal layer on the inner periphery 18, 48 Printing layer
38 Dummy Substrate

DETAILED DESCRIPTION OF THE INVENTION

In the present invention, the layer containing at least one of the antimicrobial agent and the antifungal agent (including the printing layer containing at least one of the antimicrobial agent and the antifungal agent) also is referred to as an antimicrobial/antifungal layer.

The aforementioned printing ink preferably comprises an ultraviolet-curing resin (UV-curing resin) incorporated therein.

Further, the aforementioned printing layer preferably is formed by applying the desired composition to the disk recording medium by a known printing method such as pad printing, and then subjecting the coat layer to ultraviolet curing.

Moreover, the aforementioned antimicrobial/antifungal layer preferably is provided at least on the outer periphery of the disk recording medium. More preferably, the aforementioned antimicrobial/antifungal layer is provided also in the inner periphery of the disk recording medium.

As the antifungal agent there may be used any of various known antifungal agents. Examples of these antifungal agents include volatile antifungal agent such as bromocinnamaldehyde and 2-isopropyl-5-methylphenol, and non-volatile antifungal agent such as 2-(4-thiazolyl)-benzimidazole, benzyl bromoacetate and N-dimethyl-N'-phenol-N'-(fluorodichloromethylthio)sulfamide.

The content of the antifungal agent is preferably, e.g., from 1% to 10% by weight, based on the total weight of the antimicrobial/antifungal layer.

Examples of the antimicrobial agent include silicate-based antimicrobial agent such as zeolite (crystalline aminosilicate), clay mineral and silica gel, phosphate-based antimicrobial agent such as zirconium phosphate and calcium phosphate, and so-called inorganic antimicrobial agent comprising silver adsorbed to and supported on an inorganic particulate carrier such as particulate soluble glass, activated charcoal, metal, alloy, organic metal and titanium oxide. An organic antimicrobial agent may be used.

The content of the antimicrobial agent varies with the kind of the antimicrobial agent used but is preferably from 0.1% to 10% by weight, more preferably from 0.5% to 8% by weight based on the total weight of the antimicrobial/antifungal layer, if the antimicrobial agent is a silver-substituted zeolite.

In accordance with the aforementioned arrangement of disk recording medium, the antifungal agent or antimicrobial agent contained in the printing layer can remarkably prevent the proliferation of fungi on the disk recording medium. The use of this disk recording medium makes the proliferation of fungi difficult also on index card and plastic case.

When the printing ink comprises an ultraviolet-curing resin incorporated therein, the printing ink can be irradiated with ultraviolet rays to undergo rapid curing, making it possible to enhance the productivity. Further, irradiation with ultraviolet rays can be expected to exert sterilizing effect. In other words, irradiation with ultraviolet rays can annihilate various bacteria on the surface of the disk (once in the production process), making it possible to remarkably prevent the proliferation of fungi.

The results of observation show that fungi can easily grow at the edge (periphery) of the disk recording medium. For example, the periphery of the disk recording medium is often brought into contact with the hand of the user or index card. This probably causes the proliferation of fungi. Thus, by providing a printing layer containing a antifungal agent or antimicrobial agent on the periphery of or in the interior of the disk by pad printing or the like, the proliferation of fungi on the disk recording medium can be remarkably prevented.

The term "recording surface" as used herein is meant to indicate the surface to be irradiated with recording light beam or reproducing light beam. The recording surface may be one surface or the other surface of the disk recording medium.

An antimicrobial/antifungal layer may be provided on the disk recording medium all over the entire surface thereof. However, an annular antimicrobial/antifungal layer is preferably provided on at least one of the outer periphery and the inner periphery of the disk recording medium.

In general, the user often touches at least one of the periphery and the inner side of the disk recording medium when mounting the disk recording medium on the drive device or taking it out of the drive device. Therefore, nutrients (dirt and oil such as fingerprint) necessary for the growth of fungi are moved from the user's hand to the periphery or inner side of the disk recording medium. Mildew can grow there. Further, fungi can move to the recording surface or printing surface of the disk recording medium.

The aforementioned arrangement of the disk recording medium can exert an enhanced antimicrobial and sterilizing effect on the periphery or inner side of the disk recording medium, making it possible to effectively prevent the proliferation of fungi.

The antimicrobial/antifungal layer is preferably provided on the non-recording area such as outer periphery and inner periphery of the disk recording medium. The antimicrobial/antifungal layer may be provided also on the periphery or inner side of the disk recording medium perpendicular to the recording surface thereof.

When the antimicrobial/antifungal layer is provided on the non-recording area such as outer periphery and inner periphery of the disk recording medium, there are no effects of the antimicrobial/antifungal layer on the optical properties of the disk recording medium, making it possible to perform smoother recording/reproduction.

The antimicrobial agent and antifungal agent may be used in the form of solution in water or other solvents. Further, the antimicrobial/antifungal layer may be formed by applying a mixture of the antimicrobial agent with a resin or a solution of the antimicrobial agent in the resin.

As the method for applying the antimicrobial agent or the antifungal agent, there may be used any of various methods such as coating with roller or brush, dip coating, spin coating and padding (pad printing).

In accordance with the disk recording medium of the invention, antimicrobial/antifungal layer is provided on the printing layer of the disk recording medium, making it possible to prevent the proliferation of fungi on the surface of the disk over an extended period of time. This makes it possible to perform recording/reproduction in a stable manner without impairing the reliability of the disk recording medium. This also makes it possible to exert an effect of protecting the printing layer.

The aforementioned antimicrobial/antifungal layer may be an overcoat layer of an antimicrobial agent or an antifungal agent provided on the printing layer of the disk recording medium or may be a protective layer made of an acrylic resin. This antimicrobial/antifungal layer can be formed by a simple working process without complicating the process for the production of the disk recording medium, making it possible to produce a high performance disk recording medium at a reduced cost.

Embodiments of implementation of the invention will be described in detail in connection with the attached drawings. A disk recording medium 10 according to the first embodiment shown in FIG. 1 comprises a recording surface provided on one side thereof (upper side in the drawing) and a printing surface provided on the other (lower side in the drawing). The disk recording medium 10 comprises a disk-shaped resin substrate 11 having a central hole 11a and an antimicrobial/antifungal layer 12 containing an antimicrobial agent provided on one surface of the substrate 11. Though not shown, a recording layer, a reflective layer and other layers may be provided on the substrate 11.

Figure 1:
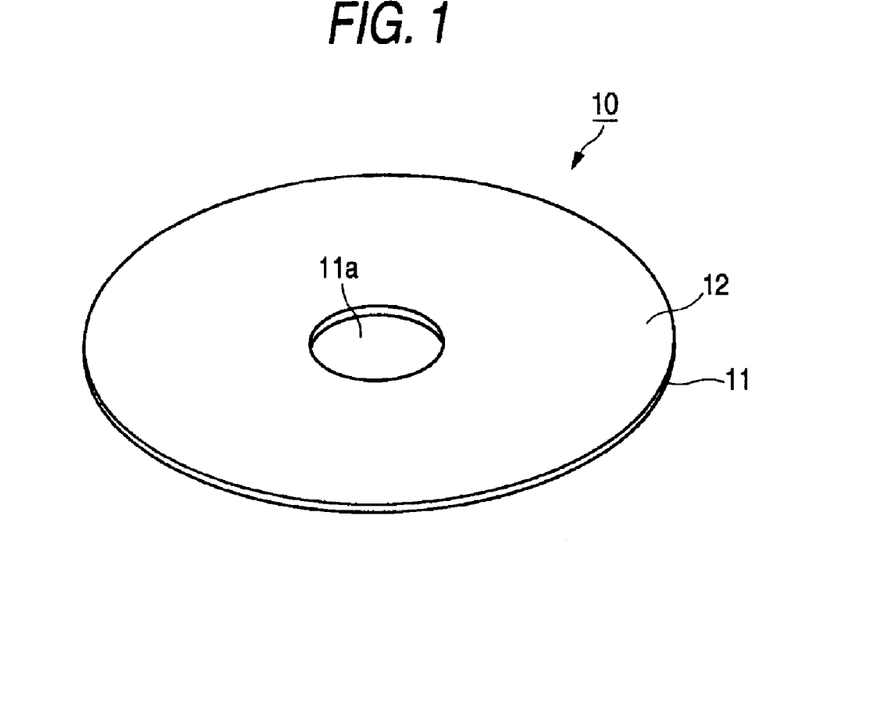
FIG. 1 is a conceptional perspective view illustrating a first embodiment of implementation of the invention.

In the present embodiment, the antimicrobial/antifungal layer 12 is provided all over the entire surface thereof.

In accordance with the aforementioned arrangement of the disk recording medium 10, there is provided the antimicrobial/antifungal layer 12 containing an antimicrobial agent that exerts an enhanced antimicrobial and sterilizing effect on the recording layer. In this arrangement, the proliferation of fungi can be remarkably prevented. The sterilizing effect of the antimicrobial/antifungal layer 12 on the recording surface makes it possible to prevent the proliferation of fungi also on the printing surface of the disk recording medium 10. Further, the use of this disk recording medium 10 makes it difficult for fungi to grow also on the index card or plastic case.

Figure 2:
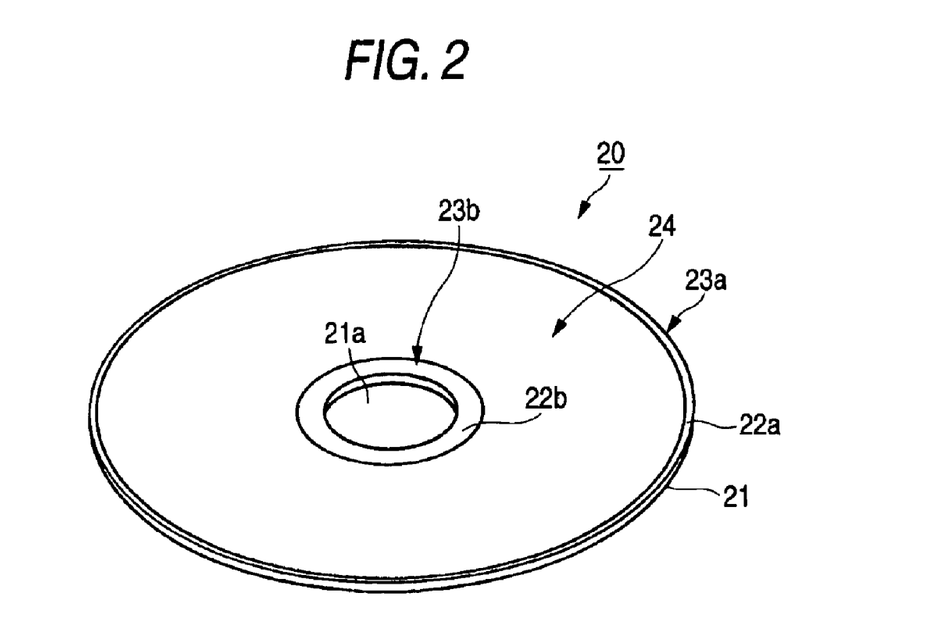
FIG. 2 is a conceptional perspective view illustrating a second embodiment of implementation of the invention.

FIG. 2 illustrates a second embodiments of implementation of the invention. A disk recording medium 20 comprises a recording surface provided on one side (upper side in the drawing) and a printing surface provided on the other (lower side in the drawing). The outer periphery and inner periphery of the disk recording medium 20 form non-recording areas 23a and 23b, respectively, which are not irradiated with recording light beam or reproducing light beam. The annular region provided between the non-recording area 23a on the periphery and the non-recording area 23b on the inner side acts as a recording area 23 which is irradiated with a recording light beam or reproducing light beam.

Figure 3:
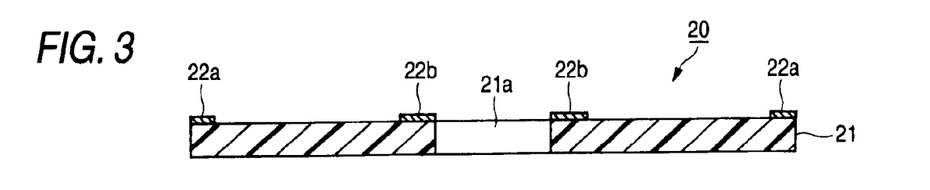
FIG. 3 is a conceptional sectional view illustrating a second embodiment of implementation of the invention.

A conceptional longitudinal sectional view of the disk recording medium 20 is shown in FIG. 3.

In the present embodiments of implementation of the invention, annular antimicrobial/antifungal layer 22a and 22b containing an antimicrobial agent are provided on the non-recording area on the recording surface. In some detail, the antimicrobial layer 22a is provided on the periphery of the substrate 21 and the antimicrobial/antifungal layer 22b is provided on the inner side of the substrate 21.

When carrying the disk recording medium 20, the user often grips the periphery and the inner side of the disk recording medium 20, causing these areas to be stained with dirt and oil of the hand. However, since the outer periphery and inner periphery of the disk recording medium 20 allow the antimicrobial/antifungal layers 22a and 22b, respectively, to exert an enhanced antimicrobial and sterilizing effect, the proliferation of fungi on the outer periphery and inner periphery of the disk recording medium 20 can be remarkably prevented.

Figure 4:
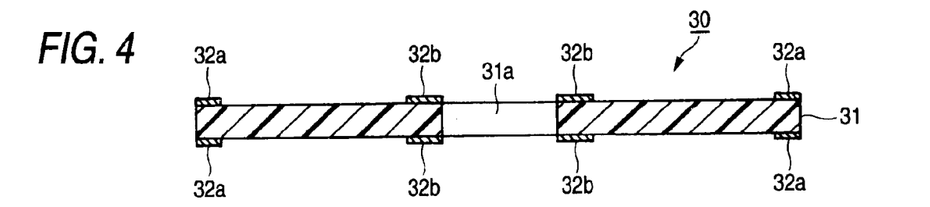
FIG. 4 is a conceptional sectional view illustrating a third embodiment of implementation of the invention.

FIG. 4 illustrates a third embodiments of implementation of the invention. A disk recording medium 30 comprises a recording surface provided on both sides thereof (one side shown as an upper side and the other shown as a lower side).

Antimicrobial/antifungal layers 32a and 32b are provided on the non-recording area (outer periphery and inner periphery) of both the recording areas.

In accordance with the aforementioned arrangement of the disk recording medium 30, the proliferation of fungi on the outer periphery and inner periphery thereof can be remarkably prevented.

Figure 5:
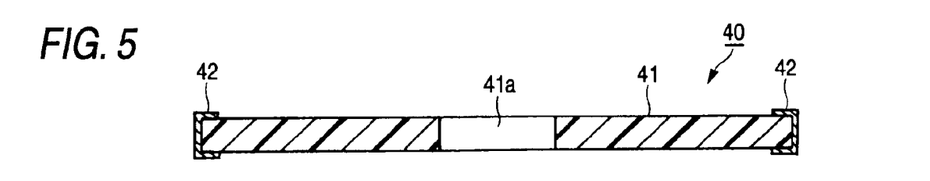
FIG. 5 in a conceptional sectional view illustrating a fourth embodiment of implementation of the invention.

FIG. 5 illustrates a fourth embodiments of implementation of the invention. The present embodiment comprises a recording surface provided on one side thereof (upper side in the drawing) and a printing surface (lower side in the drawing).

The disk recording medium 40 comprises an antimicrobial/antifungal layer containing an antimicrobial agent provided on the edge of the periphery of the disk recording medium 40. In some detail, an antimicrobial/antifungal layer 42 containing an antimicrobial agent is provided extending over the periphery of the recording surface, the periphery of the printing surface and the periphery of the substrate 41.

When carrying the disk recording medium 40, the user often grips the periphery of the disk recording medium 40, causing this area to be stained with dirt and oil of the hand. However, the disk recording medium 40 allows the antimicrobial/antifungal layer 42 provided extending over the periphery of the recording surface, the periphery of the printing surface and the periphery of the substrate 41 to remarkably prevent the proliferation of fungi on the periphery of the disk recording medium 40.

Figure 6:
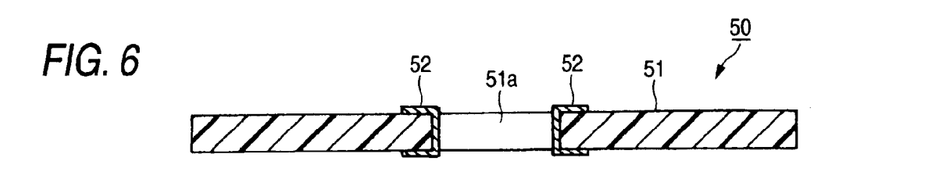
FIG. 6 is a conceptional sectional view illustrating a fifth embodiment of implementation of the invention.

FIG. 6 is a fifth embodiments of implementation of the invention. The present embodiment comprises a recording surface provided on one side thereof (upper side in the drawing) and a printing surface provided on the other (lower side in the drawing).

The disk recording medium 50 comprises an antimicrobial/antifungal layer containing an antimicrobial agent provided on the edge of the inner side thereof. In some detail, an antimicrobial/antifungal layer 52 containing an antimicrobial agent is provided extending over the inner side of the recording surface, the inner side of the printing surface and the inner side of the substrate 51. In other words, the antimicrobial/antifungal layer 52 is provided also on the cylindrical surface defining a central hole 51a.

In the central hole 51a is fitted a retaining member provided on a plastic case which is not shown. Mildew which has grown on the plastic case or which has moved from the index card to the plastic case tries to move to the inner side of the disk recording medium 50 via the retaining member. However, the inner side of the disk recording medium 50 allows the antimicrobial/antifungal layer 52 to exert an enhanced antimicrobial and sterilizing effect, fungi cannot move to the disk recording medium 50.

The invention is not limited to the aforementioned embodiment, but proper modifications and changes can be made therein.

The aforementioned embodiments may be combined. For example, both an antimicrobial/antifungal layer extending over the periphery of the recording surface, the periphery of the printing surface and the periphery of the substrate and an antimicrobial/antifungal layer extending over the inner side of the recording surface, the inner side of the printing surface and the inner side of the substrate may be provided.

An antimicrobial/antifungal layer layer according to the aforementioned the second embodiment may be provided also on the disk recording medium comprising a recording surface provided on both sides thereof.

Figure 7:
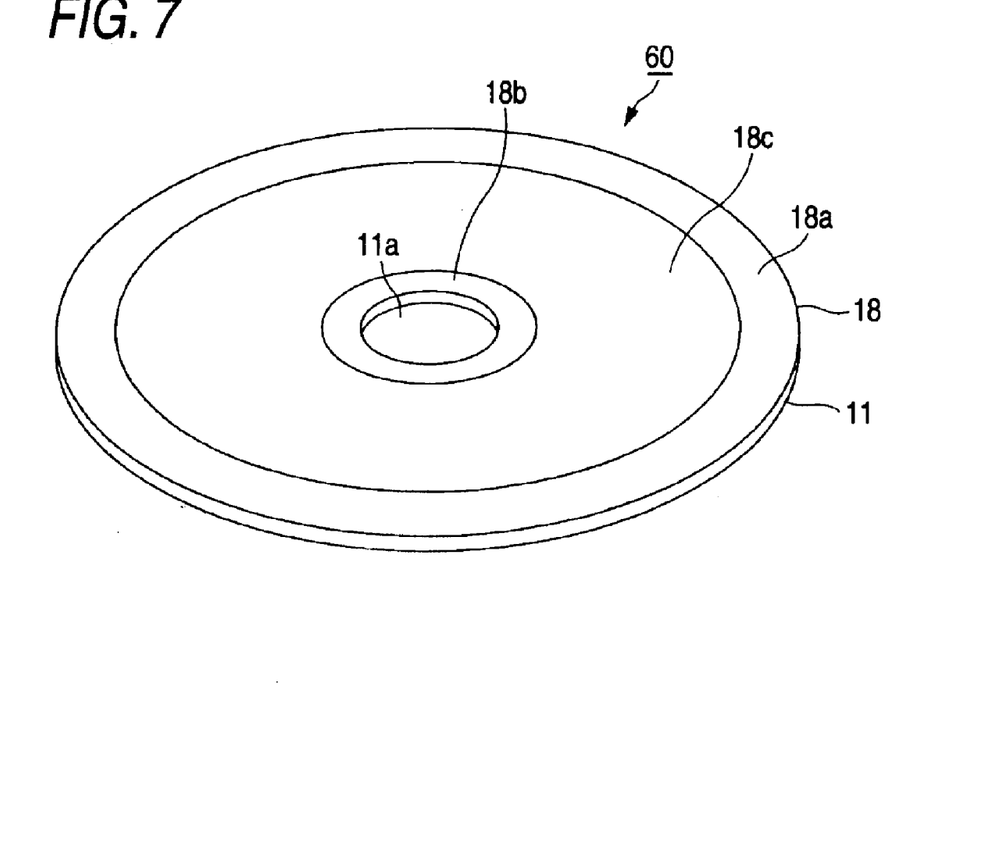
FIG. 7 is a conceptional perspective view illustrating a sixth embodiment of implementation of the invention.

FIG. 7 illustrates a sixth embodiment of implementation of the invention.

A disk recording medium (optical disk) 60 shown in FIG. 7 comprises a printing surface provided on one side (upper side in the drawing) and a recording surface provided on the other. The optical disk 60 comprises a disk-shaped resin substrate 11 having a central hole 11a and a printing layer 18 provided on one side thereof. A recording layer, a reflective layer and other layers are provided interposed between the substrate 11 and the printing layer 18 but are not shown.

In the present embodiment, the printing layer 18 consists of three regions. A first region 18a is provided along the periphery of the substrate 11. A second region 18b is provided along the inner side of the substrate 11. A third region 18c is provided interposed between the first region 18a and the second region 18b. The fist, second and third regions 18a, 18b and 18c are annular and almost concentric as viewed from above. Almost all the region between the first region 18a and the second region 18b forms the third region 18c.

Figure 8:
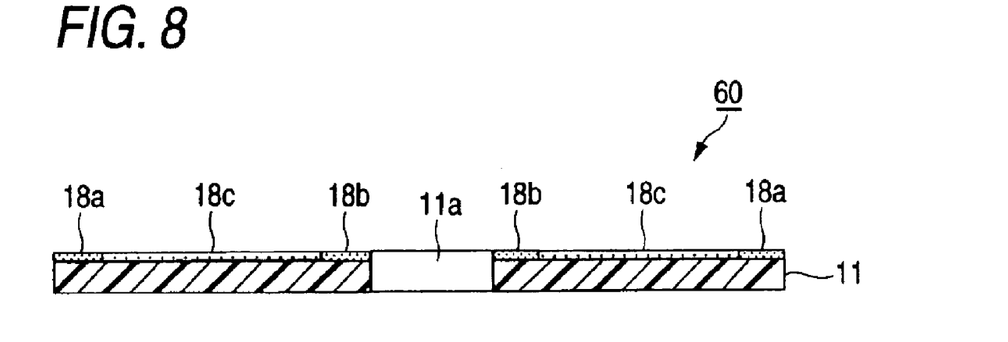
FIG. 8 is a longitudinal sectional view of FIG. 7.

A conceptional longitudinal sectional view of the optical disk 60 is shown in FIG. 8. The printing ink forming the first region 18a and the printing ink forming the second region 18b each comprise at least one of a antifungal agent and an antimicrobial agent and an ultraviolet-curing resin incorporated therein besides the pigment. The printing ink forming the third region 18c comprises an ultraviolet-curing resin incorporated therein besides the pigment.

The third region 18c displays the contents of data recorded in the optical disk, design pattern, kind of disk, etc.

Figure 9:
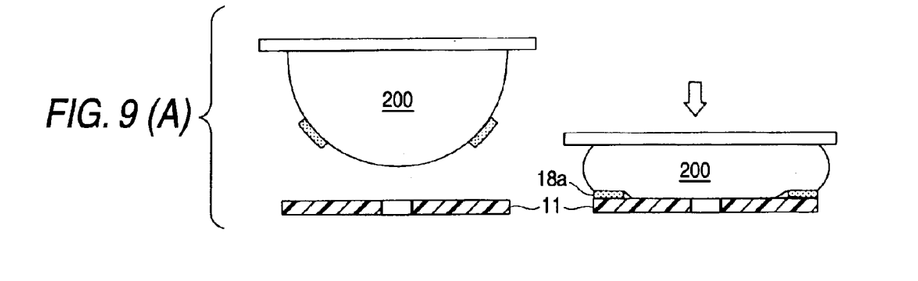
FIG. 9 is a diagram illustrating the process for the production of the sixth embodiment of the invention.

As an example of the process for the production of the optical disk 60, a process by pad printing will be described below. Firstly, as shown in FIG. 9A, a first region 18a of printing layer is provided on the periphery of the substrate 11 using a pad 200. After the drying of the first region 18a at an ultraviolet irradiation step (not shown), a second region 18b of printing layer is then provided on the inner side of the substrate 11 as shown in FIG. 9B. After the drying of the second region 18b at the ultraviolet irradiation step, a third region 18c is then provided between the first region 18a and the second region 18b as shown in FIG. 9C. Thereafter, the third region 18c is similarly dried at the ultraviolet irradiation step.

The ultraviolet curing treatment may be accomplished also by providing the printing layers 18a, 18b and 18c on the substrate, and then subjecting the coated substrate to irradiation with UV altogether.

In accordance with the aforementioned arrangement of the optical disk 60, the antifungal agent or antimicrobial agent contained in the first region 18a and the second region 18b of the printing layer 18 makes it possible to remarkably prevent the proliferation of fungi on the printing surface of the optical disk 60. The printing surface of the optical disk 60 is opposed to the index card (not shown) when received in a plastic case which is not shown. Under these conditions, the index card can be brought into contact with the periphery of the optical disk 60. However, since the first region 18a of the printing layer comprises a antifungal agent or antimicrobial agent incorporated therein, fungi which has possibly grown on the index card cannot move to the periphery of the optical disk 60. Further, when the user takes the optical disk 60 out of the plastic case or carries the optical disk 60, the user often grips the periphery and the inner side of the optical disk 60, causing these areas to be stained with dirt and oil of the user's hand. However, the antifungal agent or antimicrobial agent contained in the first region 18a and the second region 18b of the printing layer can remarkably prevent the proliferation of fungi on the outer periphery and inner periphery of the optical disk 60.

The optical disk 60 not only is insusceptible to proliferation of fungi on the printing surface thereof but also prevents fungi which has grown on the index card from moving to the printing surface opposed to the index card. Accordingly, the optical disk 60 is subject to neither proliferation nor reception of fungi on the recording surface thereof, which is provided opposite the printing surface.

The use of the optical disk 60 also allows the antifungal agent or antimicrobial agent contained in the first region 18a and the second region 18b of the printing layer to exert its effects, making it difficult for fungi to grow also on the index card and plastic case.

The optical disk 60 can be irradiated with ultraviolet rays on the printing ink containing an ultraviolet-curing resin so that the printing ink can be rapidly cured, making it possible to enhance the productivity thereof. Further, various bacteria on the surface of the optical disk 60 can be once annihilated by ultraviolet rays at the production step, making it possible to remarkably prevent the proliferation of fungi.

The invention is not limited to the aforementioned embodiment, but proper modifications and changes can be made therein.

For example, the third region of the printing layer may comprise a antifungal agent or antimicrobial agent incorporated therein. The printing layer may comprise a antifungal agent or antimicrobial agent incorporated therein all over the area thereof.

For example, the printing layer comprising a antifungal agent or antimicrobial agent incorporated therein on the first region, second region or the like may be free of pigment to form a transparent or semi-transparent layer.

Figure 10:
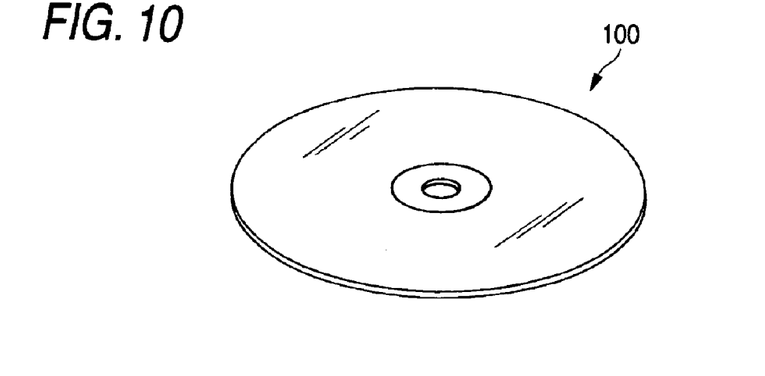
FIG. 10 is a conceptional perspective view illustrating a seventh embodiment of implementation of the invention.
Figure 11:
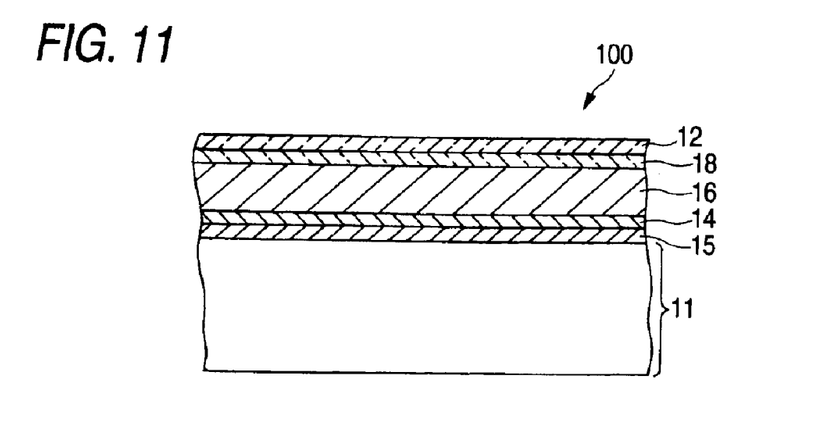
FIG. 11 is a sectional view illustrating the layer structure of the disk recording medium of FIG. 10.

FIG. 10 is a general perspective view of a disk recording medium (compact disk CD) 100 according to a seventh embodiment of implementation of the invention. FIG. 11 is a sectional view illustrating the layer structure of the disk recording medium of FIG. 10.

As shown in FIG. 7, the disk recording medium 100 according to the present embodiment comprises a recording layer 15 formed on one side of a substrate 11 made of a transparent resin, a reflective layer 14 such as vacuum deposit of aluminum, a protective layer 16, a printing layer 18, and a antimicrobial/antifungal layer 12 laminated in this order.

Referring to the method for preparing the disk recording medium 100 according to the present embodiment, a photosensitive agent (resist) is applied to a polished glass disk. The coated material is irradiated with laser beam to perform recording of signal thereon, and then subjected to development to form pits corresponding to the signal. Nickel is then deposited on the glass disk to a great thickness to obtain a master. The master is then reproduced to prepare a stamper. With this stamper put in a mold, injection molding is then effected with a transparent resin. In this manner, a molded product having a recording layer 15 transferred to one side thereof is obtained. A reflective layer 14 made of aluminum or the like is then formed by sputtering or the like. A protective material is then applied to the reflective layer 14 to form a protective layer 16 thereon. Thereafter, a label is printed on the protective layer 16 by padding, screen printing or the like to form a printing layer 18. Thus, a completed product is obtained.

The disk recording medium 100 of the present embodiment is obtained by applying a antifungal agent to the printing layer 18 of the completed product thus obtained to form a antimicrobial/antifungal layer 12. As the coating method there may be used, e.g., spin coating method.

As the antifungal agent there may be used any of various types of antifungal agents. In particular, a volatile antifungal agent such as bromocinnamaldehyde and 2-isopropyl-5-methylphenol or a nonvolatile antifungal agent such as 2-(4-thiazolyl)-benzimidazole, benzyl bromoacetate and N-dimethyl-N'-phenol-N'-(fluorodichloromethylthio) sulfamide is preferably used. Besides these antifungal agents, various antifungal agents for plastic may be used.

Due to the antifungal effect of the antimicrobial/antifungal layer 12, the disk recording medium 100 according to the present embodiment is little likely to have fungi grown thereon even when stored in a case or the like for a long period of time and thus can perform fair recording/reproduction of data over an extended period of time. The same effect can be obtained with various CD's (e.g., CD-ROM, CD-R (recordable), CD-RW (rewritable)).

A modification of the disk recording medium according to the present embodiment will be described hereinafter.

Though not shown, the modification of the disk recording medium has the same antimicrobial/antifungal layer 12 as in the disk recording medium 100 according to the aforementioned embodiment except that it is formed by an acrylic resin. This modification of disk recording medium is prepared by the same method as for the aforementioned embodiment except for the uppermost acrylic resin layer. In some detail, an acrylic resin layer having a antifungal effect is formed on the printing layer 18 having data or the like printed thereon by a method which comprises sticking an acrylic resin sheet, a method which comprises applying a liquid acrylic resin or the like.

This acrylic resin has an effect of making the proliferation of fungi difficult even at a high temperature and humidity. The reason for this effect is unknown. However, this is presumably because residual acrylic acid monomer contained in the acrylic fiber contributes to the antifungal effect.

Accordingly, due to the antifungal effect of the acrylic resin itself, this modification of the disk recording medium is little likely to have fungi grown thereon even when stored for a long period of time and thus can perform fair recording/reproduction of data over an extended period of time.

An eighth embodiment of the disk recording medium according to the invention will be described hereinafter.

Figure 12:
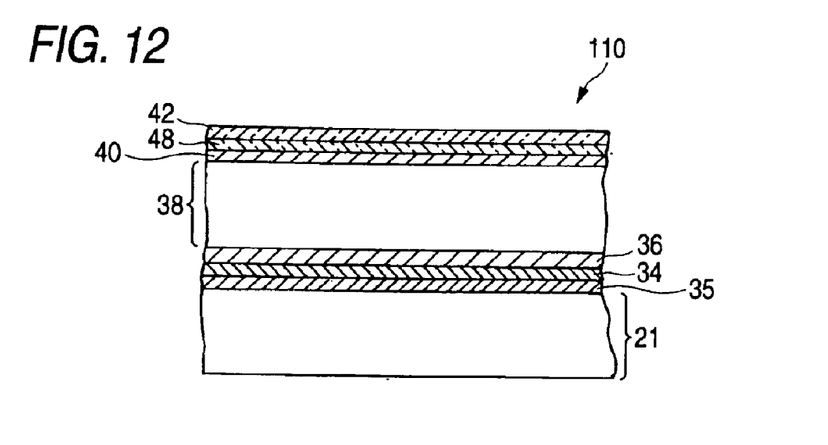
FIG. 12 is a sectional view illustrating an eighth embodiment of implementation of the invention.

FIG. 12 is a sectional view illustrating the layer structure of a disk recording medium (digital video disk DVD) 110 according to the present eighth embodiment. The disk recording medium 110 comprises a recording layer 35 formed on one side of a substrate 21 made of a transparent resin, a reflective layer 34 such as vacuum deposit of aluminum, and a protective layer (adhesive layer) 36 laminated in this order. A dummy substrate 38 is connected to the upper surface of the laminate with the protective layer 30 as an adhesive layer. A protective layer 40, a printing layer 48 and an antimicrobial/antifungal layer 42 are formed on the dummy substrate 38 on the side thereof opposite the adhesive layer 36. Thus, the disk recording medium of the present embodiment has the same structure as ordinary single-layer DVD except the uppermost antimicrobial/antifungal layer 42 of the disk recording medium 110.

In some detail, the disk recording medium 110 of the present embodiment is prepared by applying the aforementioned antifungal agent to the upper surface of the printing layer 48 having various data or the like printed thereon by spin coating method or the like to form a antimicrobial/antifungal layer 42 thereon.

This disk recording medium 110 is little likely to have fungi grow thereon even when stored at a high temperature and humidity for a long period of time and thus can perform fair recording/reproduction over an extended period of time.

As well known, while CD has a storage capacity of 650 MB, DVD, though in various forms, has a storage capacity of 4.7 GB on one side thereof or 8.5 GB in the case of two-layer structure. Accordingly, CD has a track pitch of 1.33 μm and DVD has a standard track pitch of 0.74 μm and thus has a high density recording structure having data recording pits disposed also in the direction of track. In addition, the recent trend is for more light pickup devices for DVD to have a narrow distance between the disk recording medium and the light pickup during recording/reproduction.

Therefore, DVD can undergo troubles in data recording/reproduction due to fungi on the surface of the disk and foreign matters attached thereto which don't affect CD. While CD is prepared by laminating on a substrate having a thickness of 1.2 mm, DVD is prepared by laminating on a substrate having a thickness as small as 0.6 mm. Accordingly, the ratio of size of fungi and foreign matters to the size of beam spot is much higher on DVD than on CD. Combined with the aforementioned rise of recording density, fungi and foreign matters can easily cause errors on DVD.

A modification of the present embodiment will be described hereinafter.

Though not shown, this modification of disk recording medium comprises the same antimicrobial/antifungal layer 42 as in the disk recording medium of the aforementioned embodiment except that it is formed by an acrylic resin. The acrylic resin layer may be formed by a method which comprises sticking an acrylic resin sheet or a method which comprises applying a liquid acrylic resin.

In the aforementioned arrangement, the uppermost acrylic resin layer has a antifungal layer as in the previous modification. Accordingly, the disk recording medium 110 is little likely to have fungi grown thereon even at a high temperature and humidity for a long period of time and thus can perform fair recording/reproduction over an extended period of time.

The aforementioned embodiments each represent an example of the invention and the invention is not limited thereto. Proper modifications and improvements may be made in the invention so far as the essence of the invention is not changed.

In accordance with the disk recording medium of the invention, the proliferation of fungi on the disk recording medium can be strikingly prevented for a long period of time, and the movement of fungi to other sites such as case in which it is received can be prevented, making it possible to enhance the reliability of the disk recording medium.

The entire disclosure of each and every foreign patent application from which the benefit of foreign priority has been claimed in the present application is incorporated herein by reference, as if fully set forth.

What is claimed is:

1. A disk recording medium comprising a printing layer provided on one side thereof, wherein the printing layer contains at least one of an antimicrobial agent and an antifungal agent, the printing layer is formed by a printing ink, and the printing layer contains an ultraviolet-curing resin.

2. The disk recording medium according to claim 1, which comprises:

the printing layer provided on one side thereof; and a layer containing at least one of the antimicrobial agent and the antifungal agent, in which the layer is provided on the printing layer.

3. The disk recording medium according to claim 1, wherein the printing ink is subject to an ultraviolet-curing treatment after coating.

4. The disk recording medium according to any one of claims 1, and 2, wherein the layer containing at least one of the antimicrobial agent and the antifungal agent is provided on at least one of an outer periphery and inner periphery of the disk recording medium.

* * * * *